United States Patent
Gao et al.

(10) Patent No.: US 11,854,144 B2
(45) Date of Patent: Dec. 26, 2023

(54) SUBSURFACE SCATTERING CALCULATION METHOD FOR TRANSLUCENT MATERIAL RENDERING

(71) Applicant: Beihang University, Beijing (CN)

(72) Inventors: Yang Gao, Beijing (CN); Shiyu Liang, Beijing (CN); Aimin Hao, Beijing (CN); Hongyu Wu, Beijing (CN)

(73) Assignee: Beihang University, Beijing (CN)

( * ) Notice: Subject to any disclaimer, the term of this patent is extended or adjusted under 35 U.S.C. 154(b) by 0 days.

(21) Appl. No.: 17/577,223

(22) Filed: Jan. 17, 2022

(65) Prior Publication Data

US 2023/0053410 A1 Feb. 23, 2023

(30) Foreign Application Priority Data

Aug. 19, 2021 (CN) .......................... 202110957086.7

(51) Int. Cl.
*G06T 15/50* (2011.01)
*G06T 15/30* (2011.01)

(52) U.S. Cl.
CPC ............ *G06T 15/506* (2013.01); *G06T 15/30* (2013.01)

(58) Field of Classification Search
None
See application file for complete search history.

(56) References Cited

U.S. PATENT DOCUMENTS

| 10,970,919 | B2* | 4/2021 | Dingeldey | G06T 15/08 |
| 2014/0267274 | A1* | 9/2014 | Burley | G06T 15/506 |
| | | | | 345/426 |
| 2018/0040155 | A1* | 2/2018 | Lecocq | G06T 15/50 |
| 2019/0130630 | A1* | 5/2019 | Ackerson | G06T 7/557 |
| 2021/0225076 | A1* | 7/2021 | Ratkovic | G06T 17/20 |

(Continued)

OTHER PUBLICATIONS

Sisson, Dylan. "Approximate Reflectance Profiles for Efficient Subsurface Scattering."; Christensen, Per H. "An approximate reflectance profile for efficient subsurface scattering." ACM SIGGRAPH 2015 Talks. 2015. 1-1. (Year: 2015).*

(Continued)

*Primary Examiner* — Nurun Flora
(74) *Attorney, Agent, or Firm* — Dragon Sun Law Firm, PC; Nathaniel Perkins

(57) ABSTRACT

The embodiments of the present disclosure disclose subsurface scattering calculation method for translucent material rendering, which relates to the clipping and polynomial fitting of brute-force Monte Carlo photon tracking experimental results to accurately represent the energy attenuation of subsurface scattering in distance. On this basis, an average free path and a single scattering rate are used to determine the relationship of each term in the multinomial fitting formula so as to facilitate the calculation and adjustment of the reflection profile. In the end, through a new real-time importance sampling solution, the outgoing radiation from any point on the object surface is calculated by the Monte Carlo method. This importance sampling solution is also applicable to any other subsurface scattering calculation model. By combining this subsurface scattering calculation result with other results, such as highlight reflection, any translucent material object can be rendered accurately and efficiently.

4 Claims, 4 Drawing Sheets

(56) References Cited

U.S. PATENT DOCUMENTS

2022/0076483 A1* 3/2022 Vorba .................. G06T 15/06

OTHER PUBLICATIONS

Pharr, Matt, and Pat Hanrahan. "Monte Carlo evaluation of non-linear scattering equations for subsurface reflection." Proceedings of the 27th annual conference on Computer graphics and interactive techniques. 2000. (Year: 2000).*

Qiu, Chang, Zhiqiang Wang, and Qing Zhu. "Optimization for realistic real-time rendering method for subsurface scattering." DEStech Transactions on Computer Science and Engineering 10 12783. (Year: 2017).*

Wrenninge, Magnus, Ryusuke Villemin, and Christophe Hery. "Path traced subsurface scattering using anisotropic phase functions and non-exponential free flights." Tech. Rep.. Pixar Inc., 2017. (Year: 2017).*

Chiang, Matt Jen-Yuan, Peter Kutz, and Brent Burley. "Practical and controllable subsurface scattering for production path tracing." ACM SIGGRAPH 2016 Talks. 2016. 1-2. (Year: 2016).*

Hanrahan, Pat, and Wolfgang Krueger. "Reflection from layered surfaces due to subsurface scattering." Proceedings of the 20th annual conference on Computer graphics and interactive techniques. 1993. (Year: 1993).*

* cited by examiner

SUBSURFACE SCATTERING CALCULATION METHOD FOR TRANSLUCENT MATERIAL RENDERING

CROSS-REFERENCE TO RELATED APPLICATION

The present application is based on, and claims priority from, Chinese application number CN202110957086.7, filed Aug. 19, 2021, the disclosure of which is hereby incorporated by reference herein in its entirety.

TECHNICAL FIELD

The present disclosure relates to the field of realistic real-time rendering based on physics, and in particular, to subsurface scattering calculation method for translucent material rendering.

BACKGROUND

At present, in many application fields about skin rendering, such as games, VR (virtual reality) interaction and other scenes that need to render objects in real time, it is a very important problem to render translucent objects more accurately in a shorter time. During the realistic rendering of real-world objects, the rendering equation proposed by Kajiya, usually referred to as BRDF (Bidirectional Reflection Distribution Function) calculation model, can only consider the transmission behavior of light on the surface, and the solution introduced thereby is subsurface scattering. How to calculate the subsurface scattering phenomenon on translucent objects efficiently and accurately is an important research direction of computer graphics.

During the many years of development, although some people have combined other fields with the subsurface scattering (such as machine learning), the research on the subsurface scattering can be mainly divided into four aspects: ray tracing inside the medium, analytical model based on physics, real-time calculation optimization, capturing and re-rendering. Ray tracing calculates the outgoing radiation by accumulating the contribution of the paths of a large quantity of photons. Although it is the most accurate calculation result in theory, it requires a lot of calculation time. The analytical formula based on physics obtains a reflection profile by deriving and approximately solving the radiative transfer equation. Although the calculation time is short, its calculation formula is still complex for real-time calculation. The capturing and re-rendering method can be efficient and accurate at the same time, but it needs a large amount of data storage and has certain restrictions on the rendering objects. These defects limit the application of relevant aspects in practical fields.

SUMMARY

For the real-time optimization of the subsurface scattering calculation, representative works are the separable subsurface scattering by Jimenez et al. and the normalized profile by Christensen et al. Their basic ideas are all to simplify the complex subsurface calculation formula and perform the calculation in the screen space. However, none of the relevant models can accurately give a clear definition of the maximum scattering distance, wherein Jimenez et al. used a fixed maximum scattering distance to select the sampling points, resulting in the homogeneity of the calculation results and the over blurring of the low reflection region. Christensen et al. assumed that the maximum scattering distance is infinite, which may lead to an extremely large distance between the sample points and the surface points, thus resulting in the error of calculation results. The present disclosure puts forward a novel subsurface scattering calculation model, proposing a simple polynomial mathematical model capable of more accurately fitting the calculation results of the Monte Carlo photon tracking. Besides, the maximum scattering distance can be calculated directly by a simple division method. By calculating the fitting formula using the average free path and the single scattering rate, and performing the Monte Carlo calculation in the screen space through the new importance sampling solution proposed in the present disclosure, the problem of scattering range estimation error can be overcome and an accurate rendering of translucent objects can be realized.

The technical problem solved by the present disclosure is: to solve the original estimation error and unclear definition of the scattering range, so as to make the distribution of sample points more accurate, thereby avoiding the over blurring and wrong blurring problems in subsurface scattering calculation. The new subsurface calculation model and the corresponding importance sampling solution proposed by this invention can effectively and accurately render the translucent object, especially the low reflectivity region therein, thereby meeting the accuracy and real-time performance of the subsurface scattering calculation.

The technical solution adopted by the present disclosure is: subsurface scattering calculation method for translucent material rendering, which comprises the following five steps to:

Step 1: Use the current open source brute-force Monte Carlo photon tracker MCML, define the input file parameter as an upper, middle and lower three-layer object, consider the anisotropy using the similarity theory, clip the output data to avoid the influence of zero value data on the fitting error, and finally fit the clipped data with a specific polynomial function, to obtain several groups of fitting results, in which the upper and lower layers of the upper, middle and lower three-layer object are air layers, the middle layer of the upper, middle and lower three-layer object is a measurement layer, and the thickness of the measurement layer is set to 1.0E+8 to avoid the influence of the transmitted radiation, E represents the power of 10, the refractive index $\eta$ is set to 1 to avoid the influence of the refractive index, $\eta$ represents the refractive index, the anisotropy parameter g is set to 0, and g represents the anisotropy parameter;

Step 2: Through the several groups of fitting results obtained in step 1, use specific input parameters to determine the relationship of the unknown terms in the polynomial; based on the selected fitting polynomial, determine the molecular coefficient term, the molecular constant term and the denominator constant term respectively to obtain a reflection profile calculation formula, wherein, the selected input parameters are a total diffuse reflectance considering the selected object surface, and an average free path of the object material, based on the artist friendliness;

Step 3: According to the reflection profile calculation formula obtained in step 2, calculate a cumulative distribution function cdf for the reflection profile calculation formula, and inverse the cdf to obtain an importance sampling formula, wherein, there is no numerical solution for the inverse of cdf, which needs to be approximately solved by way of fitting, the importance sampling formula does not depend on a specific profile calculation formula, the importance sampling formula is related to the average free path and the single scattering rate;

Step 4: In the operation stage, based on the reflection profile calculation formula obtained in step 2 and the importance sampling formula obtained in step 3, sample several sample points in the screen space, and use Monte Carlo to calculate the outgoing radiation of the subsurface scattering influence part of the object surface points;

Step 5: Mix the subsurface scattering influence part with the highlight influence part and the transmitted light influence part, and carry out subsequent post-processing steps to realize the final rendering of translucent objects.

The principles of the present disclosure are:

The present disclosure proposes subsurface scattering calculation method for translucent material rendering. The profile accuracy of this method is reflected in that the fitting object is a brute-force Monte Carlo photon tracker MCML, and through appropriate parameter settings and photon simulation of the order of 1.0E+6, the attenuation of radiation at each scattering distance can be accurately expressed, and fitted through a specific polynomial. Therefore, although this calculation model is not based on physics, it is more accurate than most physics-based models. The accuracy of the scattering range of this method is reflected in the selected polynomial fitting model. Through the molecular part of the polynomial, we can accurately calculate where the polynomial will be reduced to 0, and take this as the maximum scattering distance to determine the scattering range.

The artist friendliness of this method is reflected in the setting of the input parameters. The method sets the input parameters as total diffuse reflectance and average free path. Wherein, the former is usually stored as a reflectivity map in practical use, while the latter is often assumed to be constant in the same material so does not need to store extra maps. Since the direct influence factor of MCML is single scattering rate, one step for additional calculation is needed to convert the total diffuse reflectance into single scattering rate to manifest the direct influence of parameters on the profile results. In the path tracking process of Monte Carlo, the energy attenuation of photons is related only to the single scattering rate at each collision event, having nothing to do with the path length, thus resulting in a one-to-one correspondence relationship between the total diffuse reflectance and the single scattering rate. The experimental results of MCML also prove the above theory.

The real-time performance of this method is reflected in the calculation based on the screen space. In the rendering process, it is not necessary to calculate the subsurface scattering for all surface points of the object. The visible surface points can be calculated, that is, the pixel points displayed in the screen space, so as to significantly speed up the calculation. Due to the influence of perspective projection, the manifestation of the object distance at a large depth value is shorter in the screen space than that of the object with a small depth distance, so the sampling distance can not be directly used as the actual distance between two points in the screen space. Instead, a one-step projected calculation of the sampling distance should be conducted first.

The beneficial and positive effects of the present disclosure are:

(1) The present disclosure proposes a simple fitting calculation formula for converting the total diffuse reflectance into a single scattering rate, which replaces the original complex conversion calculation between the two, so as to quickly obtain the desired parameters and facilitate the subsequent profile calculation.

(2) The present disclosure proposes a novel polynomial calculation model of reflection profile to accurately calculate the maximum scattering distance, thereby avoiding wrong estimation of the scattering range and incorrect distribution of the sampling points, and making the rendering effect more accurate.

(3) The present disclosure proposes an inverse function approximate formula of the cumulative distribution function cdf depending on the average free path and single scattering rate, for performing an importance sampling calculation. This formula does not rely on a specific profile calculation model, so it is also applicable to any other forms of reflection profile calculation method.

BRIEF DESCRIPTION OF THE DRAWINGS

The above and other features, advantages, and aspects of the embodiments of the present disclosure will become more apparent in conjunction with the accompanying drawings and with reference to the following embodiments. Throughout the drawings, the same or similar reference signs indicate the same or similar elements. It should be understood that the drawings are schematic, and the components and elements are not necessarily drawn to scale.

DETAILED DESCRIPTION

Figure 1:
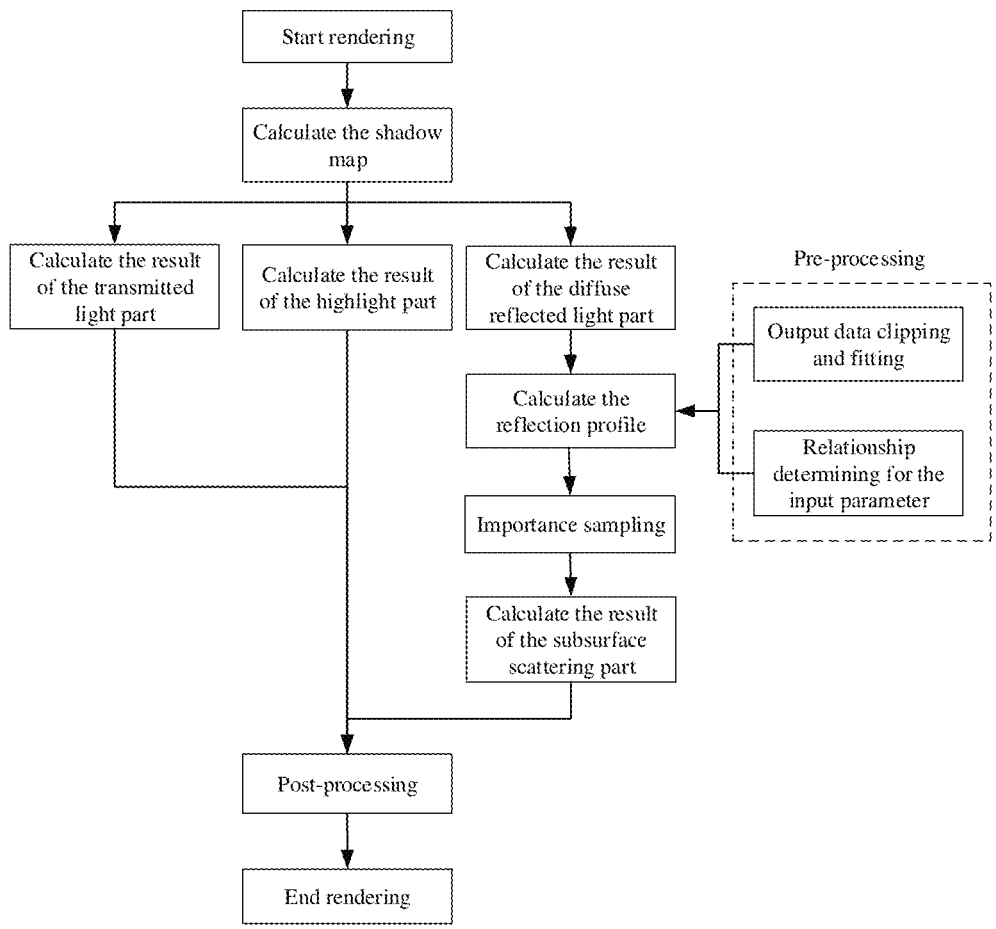
FIG. 1 is a flowchart of some embodiments of the subsurface scattering calculation method for translucent material rendering of the present disclosure.

Hereinafter, the embodiments of the present disclosure will be described in more detail with reference to the accompanying drawings. Although certain embodiments of the present disclosure are shown in the drawings, it should be understood that the present disclosure can be implemented in various forms, and shall not be construed as being limited to the embodiments set forth herein. On the contrary, these embodiments are provided for a more thorough and complete understanding of the present disclosure. It should be understood that the drawings and embodiments of the present disclosure are used only for illustrative purposes, and not to limit the protection scope of the present disclosure.

Besides, it should be noted that, for ease of description, only the portions related to the relevant invention are shown in the drawings. In the case of no conflict, the embodiments in the present disclosure and the features in the embodiments can be combined with each other.

It should be noted that such adjuncts as "one" and "more" mentioned in the present disclosure are illustrative, not restrictive, and those skilled in the art should understand that, unless the context clearly indicates otherwise, they should be understood as "one or more".

Hereinafter, the present disclosure will be described in detail with reference to the drawings and in conjunction with the embodiments.

As shown in FIG. 1, the subsurface scattering calculation method for translucent material rendering includes the following five steps to:

Step 1: Use the current open source brute-force Monte Carlo photon tracker MCML, define the input file parameter as an upper, middle and lower three-layer object, consider the anisotropy using the similarity theory, clip the output data to avoid the influence of zero value data on the fitting error, and finally fit the clipped data with a specific polynomial function, to obtain several groups of fitting results, in which the upper and lower layers of the upper, middle and lower three-layer object are air layers, the middle layer of the upper, middle and lower three-layer object is a measurement layer, and the thickness of the measurement layer is set to 1.0E+8 to avoid the influence of the transmitted radiation, E represents the power of 10, the refractive index η is set to 1 to avoid the influence of the refractive index, η represents the refractive index, the anisotropy parameter g is set to 0, and g represents the anisotropy parameter. MCML (brute-force Monte Carlo simulation) is a photon tracking simulation program in C language, which is used to simulate the energy loss when photons enter the interior of an object and re-emit. Because no optimization method is used, it is called brute-force Monte Carlo photon tracker. Similarity theory means that, when photons collide with particles inside the volume of an object, depending on the material properties of the object, the probability of it scattering in all directions may be equal (isotropic) or unequal (anisotropic). Wherein, the consideration of anisotropy is very complex, so it can be regarded as an isotropic material by similarity theory. To be specific, the object material has a scattering rate and an absorption rate. For an anisotropic material with a certain scattering rate and absorption rate, we may consider using an isotropic material with a different scattering rate and absorption rate instead. The zero value data can be the acquired data with the data value of 0.

As an example, for the output data, it is necessary to perform a maximum scattering distance judgement thereon along the scattering distance, and clip it to avoid the influence of zero value data on the fitting error, and finally fit the clipped data with a specific polynomial function.

In certain optional implementations of some embodiments, the above using the current open source brute-force Monte Carlo photon tracker MCML, defining the input file parameter as an upper, middle and lower three-layer object, considering the anisotropy using the similarity theory, and clipping the output data to avoid the influence of zero value data on the fitting error may include the following steps to:

The first step is, for the scattering distance r on the coordinate axis, starting from r=0, performing a judgement as to whether the current r is the maximum scattering distance once every time a segment of specific interval is added, wherein, this specific interval is called a clipping interval, and the clipping interval will decrease with the decrease of the maximum scattering distance, wherein, the judgment formula is as follows:

$$Rd(r'_{max}) \leq Rd(0) \times \epsilon,$$

Wherein, Rd( ) represents the reflection profile value, r represents the scattering distance, $r'_{max}$ represents the maximum scattering distance selected in the fitting process, $Rd(r'_{max})$ represents the reflection profile value at $r'_{max}$, Rd(0) represents the reflection profile value of photons at the origin of the coordinate axis, $\epsilon$ represents the fineness when determining to choose the maximum scattering distance $r=r'_{max}$, and the value of $\epsilon$ is set to 0.005, Wherein, the clipping interval is determined as follows: when $r'_{max} \in 0\sim0.5$, the clipping interval is 0.05; when $r'_{max} \in 0.5\sim1$, the clipping interval is 0.1; when $r'_{max} \in 1\sim2$, the clipping interval is 0.2; when $r'_{max} \in 2\infty5$, the clipping interval is 0.5; when $r'_{max}>5$, the clipping interval is 1; when the current scattering distance r meets the conditions of the above formula, this r is determined as the maximum scattering distance $r'_{max}$ selected in the fitting process, the data after $r'_{max}$ is removed, and a data fitting is performed to the data before $r'_{max}$ the fitting polynomial selected is as follows:

$$Rd(r) = \frac{ar+b}{r+c}.$$

Wherein, Rd(r) represents the reflection profile value of r, r represents the scattering distance, Rd( ) represents the reflection profile value, a represents the molecular coefficient term, b represents the molecular constant term, and c represents the denominator constant term.

The second step is that, based on this formula, the scattering range of the material can be accurately calculated, and the calculation formula of the maximum scattering distance $r_{max}$ is as follows:

$$r_{max} = -\frac{b}{a}.$$

Wherein, $r_{max}$ represents the maximum scattering distance actually calculated, r represents the scattering distance, max represents the maximum value, a represents the molecular coefficient term, b represents the molecular constant term, and $$-\frac{b}{a}$$

represents the opposite number of the ratio of the molecular constant term to the molecular coefficient term.

Step 2: Through the several groups of fitting results obtained in step 1, use specific input parameters to determine the relationship of the unknown terms in the polynomial; based on the selected fitting polynomial, determine the molecular coefficient term, molecular constant term and denominator constant term respectively to obtain a reflection profile calculation formula, wherein, the selected input parameters are a total diffuse reflectance considering the selected object surface and an average free path of the object material based on the artist friendliness. Artist friendliness refers to the characteristics that even non-professional artists or other users can adjust the final rendering effect through simple and easy-to-understand parameter control. The total diffuse reflectance can be the reflectance of light on the object surface. However, due to the special properties of translucent objects, light will exit at multiple other surface points after entering the object at a certain surface point. The total diffuse reflectance is the sum of the exit energy of all surface points. In subsurface scattering, the average free path can be expressed as a parameter, the average free path=1/(material scattering rage+material absorption rate).

As an example, based on the consideration of artist friendliness, the selected input parameters are the total diffuse reflectance of the object surface and the average free path of the object material. Since the output data is directly determined by the single scattering rate, a one-step additional calculation is required to convert the total diffuse reflectance into the single scattering rate. Based on the selected fitting polynomial, determine the molecular coefficient term, molecular constant term and denominator constant term respectively. In the end, a reflection profile calculation model which can be calculated by the total diffuse reflectance and the average free path is obtained.

In certain optional implementations of some embodiments, the using specific input parameters to determine the relationship of the unknown terms in the polynomial through the several groups of fitting results obtained in step 1 and determining the molecular coefficient term, molecular constant term and denominator constant term respectively to obtain a reflection profile calculation formula based on the selected fitting polynomial, may comprise the following steps:

The first step makes a simple fitting representation of the complex calculation relationship between the total diffuse reflectance and the single scattering rate, and the calculation formula is as follows:

$$\alpha = \frac{5.67A}{A^2 + 3.84A + 0.84}.$$

Wherein, $\alpha$ represents the single scattering rate, A represents the total diffuse reflectance, and $A^2$ represents the square of the total diffuse reflectance.

The second step determines the relationship of the molecular coefficient term, and the calculation formula is as follows:

$$a = -0.0064 \times \frac{1}{l} \times \alpha + 0.00316 \times \frac{1}{l} \times 0.1^{-30(\alpha-1)}.$$

Wherein, a represents the molecular coefficient term, $\alpha$ represents the single scattering rate and l represents the average free path.

The third step determines the relationship of the molecular constant term, and the calculation formula is as follows:

$b = 0.062 \times \alpha^{(6.7 \times (\alpha - 0.45)^2 + 2.6) \times \alpha + 1.3}$.

Wherein, b represents the molecular constant term and $\alpha$ represents the single scattering rate.

The fourth step determines the relationship of the denominator constant term, and the calculation formula is as follows:

$c = 0.0097 \times l \times \exp(4.2 \times \alpha) + 0.166 \times l$.

Wherein, c represents the denominator constant term, l represents the average free path, exp( ) represents the exponential function with e as the base, e represents the natural constant, and $\alpha$ represents the single scattering rate.

The fifth step calculates the reflection profile value at each scattering distance through the total diffuse reflectance and the average free path.

As an example, by substituting the calculated molecular coefficient term, molecular constant term and denominator constant term into the formula $$Rd(r) = \frac{ar + b}{r + c},$$

the reflection profile value at each scattering distance can be obtained.

Step 3: According to the reflection profile calculation formula obtained in step 2, calculate a cumulative distribution function cdf for the reflection profile calculation formula, and inverse the cdf to obtain an importance sampling formula, wherein, there is no numerical solution for the inverse of cdf, which needs to be approximately solved by way of fitting, the importance sampling formula does not depend on a specific profile calculation formula, the importance sampling formula is related to the average free path and the single scattering rate. The single scattering rate is different from the total diffuse reflectance. Photons will collide many times inside the object, and each collision will lose a fixed proportion of energy. The total diffuse reflectance can be used as the comprehensive result after multiple collisions, and the single scattering rate is a fixed reflectance during each collision.

As an example, according to the obtained reflection profile, calculate the cumulative distribution function cdf therefor, and inverse the cdf to obtain an importance sampling formula. Because the inverse of this cdf has no numerical solution, it needs to be solved approximately by way of fitting. In order to maintain the normalization of the reflection profile, it is necessary to use a correction calculation so that the cdf is exactly 1 at the actual calculated maximum scattering distance. This importance sampling formula does not rely on a specific profile calculation formula. The importance sampling formula is related to the average free path and the single scattering rate.

In certain optional implementations of some embodiments, the calculating the cumulative distribution function cdf for the reflection profile calculation formula according to the reflection profile calculation formula obtained in step 2, and inversing the cdf to obtain an importance sampling formula, may comprise the following steps:

In the first step, for the calculated reflection profile value Rd (r), an integral calculation within the [0, $r_{max}$] interval is performed to the r as a variable, to obtain a cumulative distribution function, the calculation formula is as follows:

$$cdf(r) = \frac{ar + (b - ac)\ln\left(\frac{r}{c} + 1\right)}{A} \times 2\pi.$$

Wherein, cdf(r) represents the cumulative distribution function r, r represents the scattering distance, cdf( ) represents the cumulative distribution function, a represents the molecular coefficient term, b represents the molecular constant term, c represents the denominator constant term, ln( ) represents the logarithm with e as the base, e represents the natural constant, A represents the total diffuse reflectance, and $\pi$ represents a circumference ratio.

In the second step, based on the normalization of the reflection profile value Rd(r), the value of this cdf at $r_{max}$ is 1, wherein, because the profile calculation formula is a formula based on the approximate fitting, it does not necessarily meet the condition that the value of cdf at $r_{max}$ is 1, but needs to correct the reflection profile to meet the normalization, the correction formula is as follows:

$$\begin{cases} Rd_{co}(r) = \dfrac{Rd(r)}{cdf(r_{max})} \\ cdf_{co}(r) = \dfrac{cdf(r)}{cdf(r_{max})} \end{cases}.$$

wherein, $Rd_{co}(r)$ represents the corrected reflection profile of r conforming to energy conservation, r represents the scattering distance, $Rd_{co}(\ )$ represents the corrected reflection profile conforming to the energy conservation, $Rd(r)$ represents the reflection profile value of r, $cdf(r_{max})$ represents the cumulative distribution function of $r_{max}$, $cdf(\ )$ represents the cumulative distribution function, $r_{max}$ represents the maximum scattering distance, $cdf_{co}(r)$ represents the corrected cumulative distribution function of r, $cdf_{co}(\ )$ represents the corrected cumulative distribution function, $cdf(r)$ represents the cumulative distribution function of r.

The third step is to inverse the cdf to obtain the importance sampling formula, wherein, the inverse function of the cdf has no numerical representation and needs to be approximately represented by function fitting. In order to make the importance sampling formula independent of a specific profile calculation formula and meet the artist friendliness, the input parameters are set as a single scattering rate and an average free path, the sampling formula is as follows:

$$\begin{cases} g(\xi) = (k1 \times \xi - k2) \times \sqrt{\xi} \times \ln(1.01 - \xi) \\ k1 = 1.504 \times l \times \alpha^{2.175 \times \alpha^{0.7} + 0.19} \\ k2 = 3.993 \times l \times \alpha^{3.268 \times \alpha + 0.2838} \end{cases}$$

wherein, $g(\xi)$ represents the sampling calculation formula of the scattering distance r, $\xi$ represents a random number between [0,1], k1 represents a first correlation between the parameter average free path l and the single scattering rate $\alpha$, k2 represents a second correlation between the parameter average free path l and the single scattering rate $\alpha$, $\sqrt{\phantom{-}}$ represents a square operation, $\ln(\ )$ represents the logarithm with e as a base, e represents the natural constant and l represents the average free path, and $\alpha$ represents the single scattering rate.

The fourth step is to limit the sampling distance within the scattering range, and the calculation formula is as follows:

$$r' = \min(g(\xi), r_{max}).$$

Wherein, r represents the sampling distance, $g(\xi)$ represents the sampling calculation formula for the scattering distance r, $r_{max}$ represents the maximum scattering distance, and min(,) represents the minimum of the two values.

The fifth step is to calculate the sampling distance through the above formula, and further obtain several sampling points, so as to carry out subsequent Monte Carlo calculation to obtain the outgoing radiation.

Step 4: In the operation stage, based on the reflection profile calculation formula obtained in step 2 and the importance sampling formula obtained in step 3, sample several sample points in the screen space, and use Monte Carlo to calculate the outgoing radiation of the subsurface scattering influence part of the object surface points. Wherein, Monte Carlo is different from MCML that MCML is a photon tracking simulation program based on Monte Carlo idea, while Monte Carlo is a mathematical integral calculation method, which can approximately calculate the integral on a segment of continuous interval through several discrete samples. The outgoing radiation can be the residual energy of light incident upon one surface point and emitted from another surface point, and can also be called radiation intensity.

As an example, in the operation stage, first calculate for the scene the depth map shadow map (shadow map, a common real-time shadow generation method) to obtain the minimum depth value of the target scene and the blocking condition of the object, then calculate based on the depth map shadow map, the target object's transmitted light influence result, highlight influence result and diffuse influence result respectively. Because the surface scattering refers to the energy entering the interior of the object and emitting along the surface of the same side, here a subsurface scattering calculation for the diffuse reflection result can be carried out. First, sample the scattering distance in the screen space by the calculated importance sampling formula and perform a projection calculation to obtain the positions of several sampling points. Then, use the obtained reflection profile formula in combination with Monte Carlo to calculate the outgoing radiation on any surface point of the object.

Step 5: Mix the subsurface scattering influence part with the highlight influence part and the transmitted light influence part, and carry out subsequent post-processing steps to realize the final rendering of translucent objects. The post-processing steps include bloom flood light and anti-aliasing process to optimize the rendering effect of the target object. Wherein, the bloom flood light can be understood as an enhanced glow or halo effect. So far, the final rendering of translucent objects is realized completely.

Figure 2:
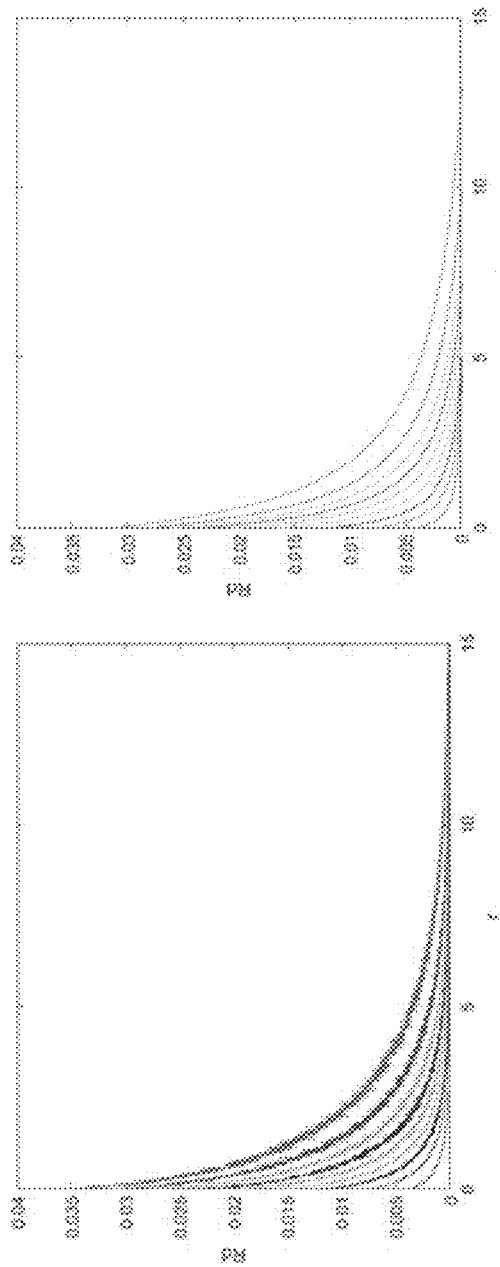
FIG. 2 is a comparison diagram between the results of the Monte Carlo photon tracker (left) and the reflection profile (right) in the present disclosure.
Figure 3:
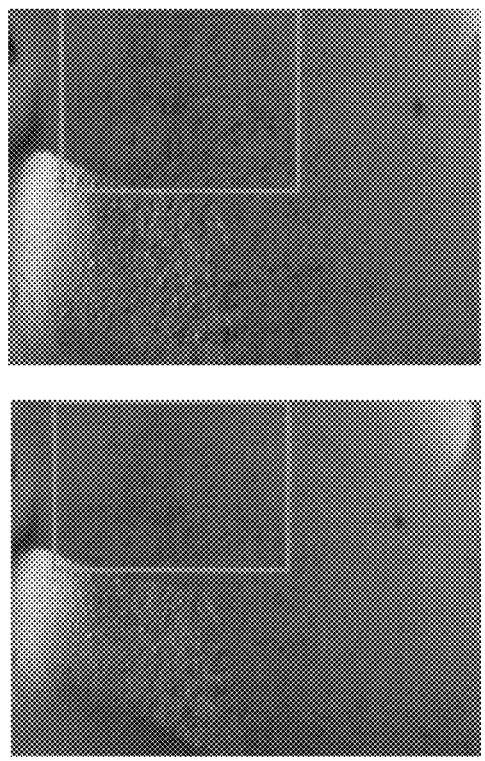
FIG. 3 is a comparison between the rendering results (top) of the algorithm in the low reflectivity region (such as beard) on the face and the results (bottom) of the separable subsurface scattering algorithm in the present disclosure.
Figure 4:
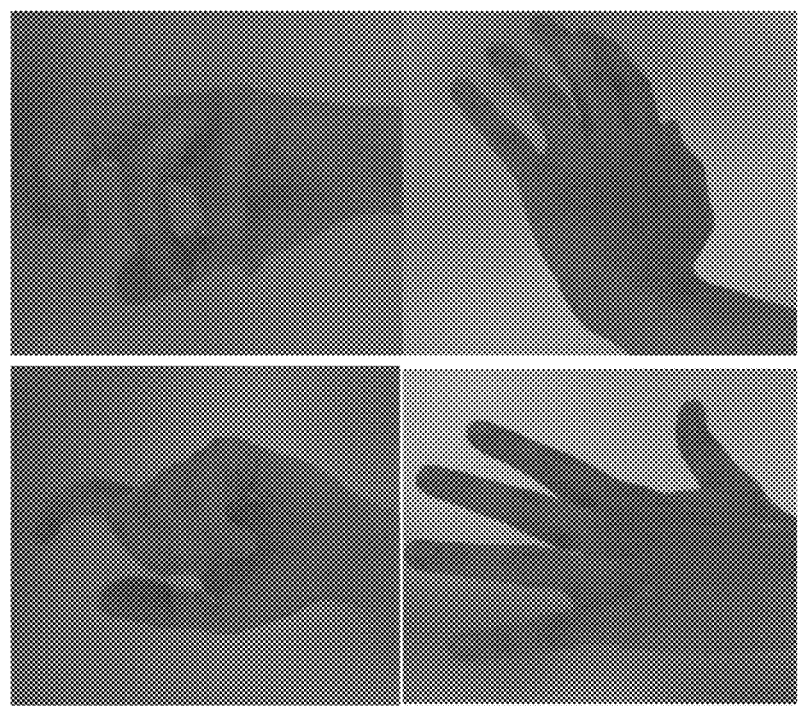
FIG. 4 is a representation of the algorithm of the present disclosure on a human hand object.
Figure 5:
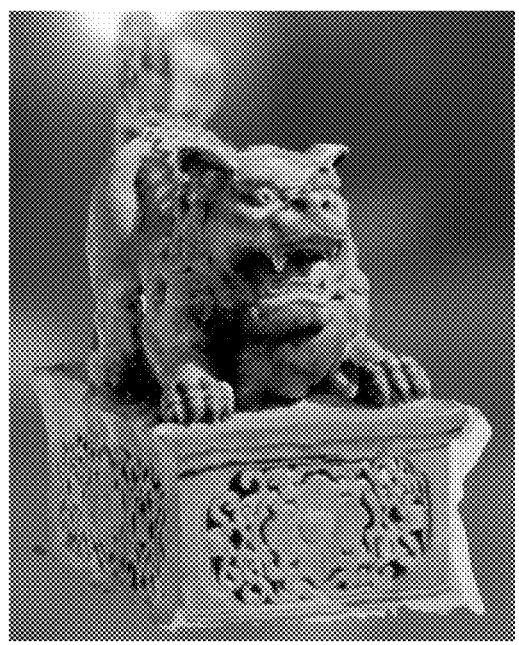
FIG. 5 is a representation of the algorithm of the present disclosure on a marble statue.

FIG. 2 is a comparison diagram between the results of the Monte Carlo photon tracker (left) and the reflection profile (right) in the present disclosure under different single scattering rates, which can manifest that the reflection profile in the present disclosure can accurately fit the experimental results of Monte Carlo. FIG. 3 is a comparison between the rendering results (top) of the algorithm at the beard (low reflectivity region) on the face and the results (bottom) of the separable subsurface scattering algorithm in the present disclosure, which can manifest that the new algorithm in the present disclosure can effectively render the details of the low reflectivity region of a translucent object and avoid the excessive blur caused by the fairly large evaluation of the scattering region in the previous algorithm. FIG. 4 is a representation of the algorithm of the present disclosure on a human hand object. FIG. 5 is a representation of the algorithm of the present disclosure on a marble statue.

The technical contents not described in detail in the present disclosure, such as the calculation of shadow map, the calculation of the results of highlight and transmitted light, the Monte Carlo calculation method, bloom flood light processing and anti-aliasing processing algorithm and etc., belong to the common knowledge of those skilled in the art engaged in physics-based realistic rendering.

Although the illustrative embodiments of the present disclosure are described above to help those skilled in the art understand the present disclosure, it should be clear that the present disclosure is not limited to the scope of these embodiments. For those skilled in the art, any variations are obvious as long as they are within the spirit and scope of the present disclosure limited and determined by the appended claims, and all inventions and creations conceived by using the present disclosure shall fall with the claimed scope of protection.

What is claimed is:

1. A subsurface scattering calculation method for translucent material rendering, comprising:
   step 1: using Monte Carlo photon tracker MCML, defining input file parameters as an upper, middle and lower three-layer object, considering anisotropy using a similarity theory, clipping an output data to avoid an influence of zero value data on a fitting error, and fitting the clipped data with a specific polynomial function, to obtain several groups of fitting results, in which upper and lower layers of the upper, middle and lower three-layer object are air layers, a middle layer of the upper, middle and lower three-layer object is a measurement layer, a refractive index η is set to 1 to avoid an influence of the refractive index, and, an anisotropy parameter g is set to 0;

step 2: through the several groups of fitting results obtained in step 1, using input parameters to determine a relationship of unknown terms in the polynomial; based on a selected fitting polynomial, determining a molecular coefficient term, a molecular constant term and a denominator constant term respectively to obtain a reflection profile calculation formula, wherein, the input parameters are a total diffuse reflectance considering a selected object surface, and an average free path of an object material, based on an artist friendliness;

step 3: according to the reflection profile calculation formula obtained in step 2, calculating a cumulative distribution function cdf for the reflection profile calculation formula, and inversing the cdf to obtain an importance sampling formula, wherein, there is no numerical solution for the inverse of cdf, which is approximately solved by way of fitting, the importance sampling formula does not depend on a specific profile calculation formula, the importance sampling formula is related to the average free path and a single scattering rate;

step 4: in an operation stage, based on the reflection profile calculation formula obtained in step 2 and the importance sampling formula obtained in step 3, sampling several sample points in a screen space, and using Monte Carlo to calculate an outgoing radiation of a subsurface scattering influence part of object surface points;

step 5: mixing the subsurface scattering influence part with a highlight influence part and a transmitted light influence part, and carrying out subsequent post-processing steps to realize final rendering of translucent objects.

2. The method of claim 1, wherein the step 1 comprises:

for a scattering distance r on a coordinate axis, starting from r=0, performing a judgement as to whether the current r is a maximum scattering distance once every time a segment of specific interval is added, wherein, this specific interval is called a clipping interval, and the clipping interval will decrease with a decrease of the maximum scattering distance, wherein, a judgment formula is as follows:

$$Rd(r'_{max}) \leq Rd(0) \times \epsilon,$$

wherein, Rd( ) represents a reflection profile value, $Rd(r'_{max})$ represents the reflection profile value at $r'_{max}$, $Rd(0)$ represents the reflection profile value of photons at an origin of the coordinate axis, $\epsilon$ represents a fineness when determining to choose the maximum scattering distance $r=r'_{max}$, and a value of $\epsilon$ is set to 0.005, wherein, the clipping interval is determined as follows: when $r'_{max} \in 0\sim0.5$, the clipping interval is 0.05; when $r'_{max} \in 0.5\sim1$, the clipping interval is 0.1; when $r'_{max} \in 1\sim2$, the clipping interval is 0.2; when $r'_{max} \in 2\sim5$, the clipping interval is 0.5; when $r'_{max} > 5$, the clipping interval is 1; when the current scattering distance r meets conditions of the above formula, this r is determined as the maximum scattering distance $r'_{max}$ selected in the fitting process, data after $r'_{max}$ is removed, and a data fitting is performed to data before $r'_{max}$, the fitting polynomial selected is as follows:

$$Rd(r) = \frac{ar+b}{r+c},$$

wherein, Rd(r) represents the reflection profile value of r, a represents the molecular coefficient term, b represents the molecular constant term, and c represents the denominator constant term;

based on this formula, a scattering range of the material can be accurately calculated, and a calculation formula of the wherein maximum scattering distance $r_{max}$ is defined as follows:

$$r_{max} = -\frac{b}{a},$$

wherein, $r_{max}$ represents the maximum scattering distance actually calculated, and $$-\frac{b}{a}$$

represents an opposite number of a ratio of the molecular constant term to the molecular coefficient term.

3. The method of claim 2, wherein the step 2 comprises:

making a simple fitting representation of a complex calculation relationship between the total diffuse reflectance and the single scattering rate, with a calculation formula being as follows:

$$\alpha = \frac{5.67A}{A^2 + 3.84A + 0.84},$$

wherein, $\alpha$ represents the single scattering rate, A represents the total diffuse reflectance, and $A^2$ represents a square of the total diffuse reflectance;

determining a relationship of the molecular coefficient term, with a calculation formula being as follows:

$$a = -0.0064 \times \frac{1}{l} \times \alpha + 0.00316 \times \frac{1}{l} \times 0.1^{-30(\alpha-1)},$$

wherein l represents the average free path;

determining a relationship of the molecular constant term, with a calculation formula being as follows:

$$b = 0.062 \times \alpha^{(6.7 \times (\alpha-0.45)^2 + 2.6) \times \alpha + 1.3},$$

determining a relationship of the denominator constant term, with a calculation formula being as follows:

$$c = 0.0097 \times l \times \exp(4.2 \times \alpha) + 0.166 \times l,$$

wherein exp( ) represents an exponential function with e as a base;

calculating the reflection profile value at each scattering distance through the total diffuse reflectance and the average free path.

4. The method of claim 3, wherein the step 3 comprises:

for the calculated reflection profile value Rd(r), performing an integral calculation within a [0, rmax] interval to the r as a variable, to obtain the cumulative distribution function, with a calculation formula being as follows:

$$cdf(r) = \frac{ar + (b-ac)\ln\left(\frac{r}{c}+1\right)}{A} \times 2\pi,$$

wherein, cdf(r) represents the cumulative distribution function of r;

based on a normalization of the reflection profile value Rd(r), a value of this cdf at $r_{max}$ being 1, wherein, because the profile calculation formula is a formula based on the approximate fitting, it does not necessarily meet the condition that the value of cdf at $r_{max}$ is 1, but needs to correcting the reflection profile and the cdf( ) to meet the normalization, the correction formula being as follows:

$$\begin{cases} Rd_{co}(r) = \dfrac{Rd(r)}{cdf(r_{max})} \\ cdf_{co}(r) = \dfrac{cdf(r)}{cdf(r_{max})} \end{cases},$$

wherein, $Rd_{co}(r)$ represents the corrected reflection profile of r conforming to energy conservation, $Rd_{co}(\ )$ represents the corrected reflection profile conforming to the energy conservation, $cdf(r_{max})$ represents the cumulative distribution function of $r_{max}$, $cdf_{co}(r)$ represents the corrected cumulative distribution function of r, $cdf_{co}(\ )$ represents the corrected cumulative distribution function;

inversing the cdf to obtain the importance sampling formula, wherein, an inverse function of the cdf has no numerical representation and needs to be approximately represented by function fitting, and in order to make the importance sampling formula independent of a specific profile calculation formula and meet the artist friendliness, the input parameters are set as the single scattering rate and the average free path, the sampling formula being as follows:

$$\begin{cases} g(\xi) = (k1 \times \xi - k2) \times \sqrt{\xi} \times \ln(1.01 - \xi) \\ k1 = 1.504 \times l \times \alpha^{2.175 \times \alpha^{0.7} + 0.19} \\ k2 = 3.993 \times l \times \alpha^{3.268 \times \alpha + 0.2838} \end{cases},$$

wherein, $g(\xi)$ represents the sampling calculation formula of the scattering distance r, $\xi$ represents a random number between [0,1], k1 represents a first correlation between the parameter average free path l and the single scattering rate $\alpha$, k2 represents a second correlation between the parameter average free path l and the single scattering rate $\alpha$;

limiting a sampling distance within the scattering range, with a calculation formula being as follows:

$$r' = \min(g(\xi), r_{max}),$$

wherein, r represents the sampling distance and min(,) represents a minimum of two values;

calculating the sampling distance through the above formula, and further obtaining several sampling points, so as to carry out subsequent Monte Carlo calculation to obtain the outgoing radiation.

\* \* \* \* \*